United States Patent
Okamoto et al.

(10) Patent No.: US 7,310,823 B2
(45) Date of Patent: Dec. 18, 2007

(54) DIGITAL INFORMATION RECORDING APPARATUS AND OUTPUTTING APPARATUS

(75) Inventors: Hiroo Okamoto, Yokohama (JP); Hitoaki Owashi, Yokohama (JP); Atsushi Yoshioka, Ebina (JP)

(73) Assignee: Hitachi, Ltd., Tokyo (JP)

( * ) Notice: Subject to any disclaimer, the term of this patent is extended or adjusted under 35 U.S.C. 154(b) by 751 days.

(21) Appl. No.: 10/133,604

(22) Filed: Apr. 25, 2002

(65) Prior Publication Data
US 2003/0026425 A1 Feb. 6, 2003

(30) Foreign Application Priority Data
Jul. 6, 2001 (JP) .............................. 2001-205608

(51) Int. Cl.
*H04L 9/00* (2006.01)
(52) U.S. Cl. .................... 726/31; 713/193; 380/201; 380/255
(58) Field of Classification Search ............... 713/193; 380/255, 201; 726/31
See application file for complete search history.

(56) References Cited

U.S. PATENT DOCUMENTS

| | | | | |
|---|---|---|---|---|
| 4,015,090 A | * | 3/1977 | Kitada ........................... | 379/79 |
| 4,912,570 A | * | 3/1990 | Kinoshita et al. ............... | 360/8 |
| 5,068,878 A | * | 11/1991 | Lin et al. ..................... | 375/362 |
| 5,111,304 A | * | 5/1992 | Kinoshita et al. ............ | 386/101 |
| 5,159,502 A | * | 10/1992 | Ejima et al. ................... | 360/62 |
| 5,260,800 A | * | 11/1993 | Sturm et al. .................... | 386/2 |
| 5,345,433 A | * | 9/1994 | Ohga et al. ............... | 369/47.29 |
| 5,410,667 A | * | 4/1995 | Belsan et al. ................ | 711/114 |
| 5,412,628 A | * | 5/1995 | Yamazaki et al. ........ | 369/30.19 |
| 5,506,825 A | * | 4/1996 | Gushima et al. .............. | 386/96 |
| 5,689,559 A | * | 11/1997 | Park .......................... | 380/203 |
| 5,719,937 A | * | 2/1998 | Warren et al. .............. | 380/203 |
| 5,740,142 A | * | 4/1998 | Nishiyama et al. ...... | 369/59.27 |
| 5,761,301 A | * | 6/1998 | Oshima et al. ............... | 705/57 |
| 5,764,607 A | * | 6/1998 | Maeda et al. ............ | 369/47.12 |
| 5,774,548 A | * | 6/1998 | Bando et al. ................ | 380/212 |
| 5,796,538 A | * | 8/1998 | Ji et al. ........................ | 360/71 |
| 5,796,684 A | * | 8/1998 | Yaegashi ..................... | 709/230 |
| 5,799,081 A | * | 8/1998 | Kim et al. ................... | 380/203 |
| 5,813,009 A | * | 9/1998 | Johnson et al. ............. | 707/100 |
| 5,818,570 A | * | 10/1998 | Urbanczyk ................... | 355/75 |

(Continued)

FOREIGN PATENT DOCUMENTS

JP 10-162559 A 6/1998

(Continued)

OTHER PUBLICATIONS

J.P.M.G. Linnartz, The "Ticket" Concept for Copy Control Based on Embedded Signalling, Lecture Notes in Computer Science, vol. 1485, Jan. 1998, pp. 257-274.*

*Primary Examiner*—Nasser Moazzami
*Assistant Examiner*—David Garcia Cervetti
(74) *Attorney, Agent, or Firm*—Townsend and Townsend and Crew LLP

(57) ABSTRACT

A digital information recording apparatus includes multiple recording circuits for making multiple copies. The apparatus limits the number of copies, however, in accordance with copy information provided within the digital information itself. When the number of copies is reached, if additional copies are to be made, then the source copy is disabled when a new copy is made.

15 Claims, 4 Drawing Sheets

U.S. PATENT DOCUMENTS

| | | | |
|---|---|---|---|
| 5,825,969 A * | 10/1998 | Ono et al. | 386/94 |
| 5,832,174 A * | 11/1998 | You | 386/92 |
| 5,896,454 A * | 4/1999 | Cookson et al. | 360/60 |
| 5,915,019 A * | 6/1999 | Ginter et al. | 705/54 |
| 5,917,912 A * | 6/1999 | Ginter et al. | 713/187 |
| 5,946,276 A * | 8/1999 | Ridges et al. | 710/52 |
| 5,987,126 A * | 11/1999 | Okuyama et al. | 380/203 |
| 6,070,171 A * | 5/2000 | Snyder et al. | 707/203 |
| 6,081,897 A * | 6/2000 | Bersson | 726/32 |
| 6,108,423 A * | 8/2000 | Sako et al. | 380/203 |
| 6,118,871 A * | 9/2000 | Okuyama et al. | 380/201 |
| 6,141,298 A * | 10/2000 | Miller | 369/30.33 |
| 6,185,576 B1 * | 2/2001 | McIntosh | 707/200 |
| 6,208,612 B1 * | 3/2001 | Miller | 369/30.19 |
| 6,223,285 B1 * | 4/2001 | Komuro et al. | 713/160 |
| 6,226,618 B1 * | 5/2001 | Downs et al. | 705/1 |
| 6,256,390 B1 * | 7/2001 | Okuyama et al. | 380/201 |
| 6,272,088 B1 * | 8/2001 | Aramaki et al. | 369/53.24 |
| 6,278,807 B1 * | 8/2001 | Ito et al. | 382/309 |
| 6,289,103 B1 * | 9/2001 | Sako et al. | 380/201 |
| 6,292,852 B1 * | 9/2001 | Bodo et al. | 710/20 |
| 6,301,066 B1 * | 10/2001 | Uno | 360/45 |
| 6,330,670 B1 * | 12/2001 | England et al. | 713/2 |
| 6,363,488 B1 * | 3/2002 | Ginter et al. | 726/1 |
| 6,470,089 B2 * | 10/2002 | Ito et al. | 382/100 |
| 6,499,106 B1 * | 12/2002 | Yaegashi et al. | 713/193 |
| 6,519,571 B1 * | 2/2003 | Guheen et al. | 705/14 |
| 6,536,037 B1 * | 3/2003 | Guheen et al. | 717/151 |
| 6,539,468 B1 * | 3/2003 | Inoue et al. | 712/36 |
| 6,579,613 B1 * | 6/2003 | Uwazumi et al. | 428/336 |
| 6,584,552 B1 * | 6/2003 | Kuno et al. | 711/163 |
| 6,587,837 B1 * | 7/2003 | Spagna et al. | 705/26 |
| 6,636,462 B1 * | 10/2003 | Drynkin et al. | 369/30.19 |
| 6,643,085 B2 * | 11/2003 | Shirai et al. | 360/60 |
| 6,678,236 B1 * | 1/2004 | Ueki | 369/275.3 |
| 6,691,228 B1 * | 2/2004 | Sako et al. | 713/193 |
| 6,704,733 B2 * | 3/2004 | Clark et al. | 707/10 |
| 6,804,457 B1 * | 10/2004 | Miyashita et al. | 386/109 |
| 6,820,063 B1 * | 11/2004 | England et al. | 705/54 |
| 6,832,318 B1 * | 12/2004 | Yaegashi et al. | 713/193 |
| 6,876,617 B1 * | 4/2005 | Huma | 369/59.21 |
| 6,917,566 B2 * | 7/2005 | Griner et al. | 369/1 |
| 6,948,070 B1 * | 9/2005 | Ginter et al. | 713/193 |
| 6,950,520 B1 * | 9/2005 | Ryan et al. | 380/200 |
| 6,980,653 B1 * | 12/2005 | Sako et al. | 380/203 |
| 7,076,652 B2 * | 7/2006 | Ginter et al. | 713/153 |
| 7,092,320 B1 * | 8/2006 | Lee et al. | 369/30.32 |
| 7,095,854 B1 * | 8/2006 | Ginter et al. | 380/233 |
| RE39,297 E * | 9/2006 | Oshima et al. | 369/272.1 |
| 7,120,800 B2 * | 10/2006 | Ginter et al. | 713/193 |
| 7,124,101 B1 * | 10/2006 | Mikurak | 705/35 |
| 7,124,302 B2 * | 10/2006 | Ginter et al. | 713/189 |
| 2001/0043515 A1 * | 11/2001 | Ueki | 369/30.1 |
| 2002/0031071 A1 * | 3/2002 | Han et al. | 369/53.22 |
| 2002/0041686 A1 * | 4/2002 | Moriyama et al. | 380/201 |
| 2002/0054441 A1 * | 5/2002 | Sato et al. | 360/15 |
| 2002/0071648 A1 * | 6/2002 | Matsumura et al. | 386/1 |
| 2002/0150245 A1 * | 10/2002 | Sugimoto et al. | 380/201 |
| 2003/0120942 A1 * | 6/2003 | Yoshida et al. | 713/193 |
| 2003/0154388 A1 * | 8/2003 | Yabuno et al. | 713/193 |
| 2003/0161609 A1 * | 8/2003 | Hamada et al. | 386/46 |
| 2005/0091283 A1 * | 4/2005 | Debique et al. | 707/104.1 |

FOREIGN PATENT DOCUMENTS

| | | |
|---|---|---|
| JP | 11-122282 A | 4/1999 |
| JP | 2000-057059 A | 2/2000 |
| JP | 2000-149417 | 5/2000 |
| JP | 2000-149417 A | 5/2000 |
| JP | 2000-322826 A | 11/2000 |
| JP | 2000-330870 A | 11/2000 |
| JP | 2001-008185 A | 1/2001 |

* cited by examiner

DIGITAL INFORMATION RECORDING APPARATUS AND OUTPUTTING APPARATUS

BACKGROUND OF THE INVENTION

1. Field of the Invention

The present invention relates to an information reproducing apparatus for reproducing digital information such as video, voice, etc., as well as an information recording/reproducing apparatus for the same. More particularly, the present invention relates to an apparatus for limiting recording of reproduced information onto other media on authorities given by the copyright holders, etc.

2. Description of Related Art

Now that digital TV broadcasting is started, various private-use digital recording/reproducing apparatuses have been put on the market in such package media fields as movie software, etc. so as to cope with such digital broadcasting contents. In the near future, package software to be used for those apparatuses are also expected to appear on the market. The most attractive advantage of such digital broadcasting and digital recording apparatuses is that no or almost no quality degradation is recognized in the respective processes of sending/recording/reproducing. And accordingly, a serious problem comes to arise from such the advantage of those digital apparatuses; a lot of illegal copies are generated from the high quality digital information of originals with use of those apparatuses and sold where the copyright holders do not know, so that no profit is returned to the copyright holders.

In order to solve the problem, U.S. Pat. No. 5,896,454 discloses a method for adding 2-bit copy control information to every information item. According to this method, the operation of a recording apparatus is controlled so that any one of the three choices "Copy Never", "Copy Free", and "one generation of copies is permitted" is selected. The recording apparatus does not work when "Copy Never" is set and starts recording when "Copy Free" is set.

If "Copy Never" is set for the copy control information when in broadcasting, a problem might arise; for example, when the user has a visitor while watching broadcast contents, the user might miss the contents and have no means for watching them later. The official gazette of JP-A149417/2000 discloses a method for solving this problem by means of "Temporary Recording" even when "Copy Never" is set for the copy control information. This is a method for recording physically the desired information on a recording medium once, then the user is enabled to watch the reproduced information for a predetermined period, for example, for just 90 minutes and the information is erased after that. This limit time is called as "retention period". In other words, the method disables the information to be stored for a long time and used in other ways; it just enables the broadcast content to be watched only for 90 minutes, which is equivalent to the price. This method can solve the above-described inconvenience of the user, since the recorded information is not stored for a long time, so that the copyright holder's profit can be protected. The "Temporary Recording" is often set in a hard disk recorder built in the receiver due to the characteristics.

BRIEF SUMMARY OF THE INVENTION

Each of the methods disclosed in the conventional techniques described above premises that one recording/reproducing apparatus has one recording/reproducing circuit. Actually, however, there will appear on the market such the recording/reproducing apparatuses referred to as so-called double deck apparatuses will often have a plurality of recording/reproducing circuits in its housing so as to be used for copying and editing. If such an apparatus is used and "one generation of copies is permitted" is set for the copy control information, many copies will come to be done. This results in disadvantages for the copyright holders. And, no document has mentioned this problem so far.

Under such circumstances, it is an object of the present invention to provide means that keep the original rules related to such the copying and an apparatus that employs such the means even after an apparatus provided with a plurality of recording/reproducing circuits appears on the market.

In order to achieve the above object, the digital information recording apparatus of the present invention comprises a plurality of recording circuits, each having a plurality of recording media enabled to record inputted digital information. And, the recording apparatus of the present invention is configured so that the number of media enabled to record digital information is limited only to a predetermined number when the copy control information added to the inputted digital information indicates a limit of copying.

The digital information outputting apparatus of the present invention outputs digital information to a plurality of external information recording apparatuses. The digital information outputting apparatus includes an authenticating circuit that authenticates respective information recording apparatuses and detects the total number of recording media mounted in the apparatuses, as well as an output controlling circuit that controls output of digital information to the information recording apparatuses. When the copy control information added to the subject digital information indicates a limit of copying and the total number of recording media mounted in the external information recording apparatuses detected by the authenticating circuit exceeds the predetermined number of permitted recording media, the output of the digital information to some of the information recording apparatuses is disabled.

In another configuration, the digital information recording apparatus of the present invention includes a plurality of recording circuits, each having a plurality of recording media enabled to record digital information. And, the digital information recording apparatus is configured so that the copy control information added to inputted digital information indicates a limit of copying, the plurality of recording circuits are enabled to record the digital information once on the plurality of recording media, then at least one of said plurality of recording media is enabled to reproduce the digital information; reproduction from other media are disabled.

In still another configuration, the digital information recording apparatus of the present invention includes a plurality of recording circuits, each having a plurality of recording media enabled to record digital information. And, the apparatus is configured so as to enable only one of the plurality of recording circuits to record the digital information on only one recording medium when the copy control information added to the inputted digital information indicates a limit of copying.

In still another configuration, the digital information recording apparatus of the present invention includes a plurality of recording circuits, each having a plurality of recording media enabled to record digital information. And, the apparatus is configured so as to enable the plurality of recording circuits to record inputted digital information once on the plurality of recording media, then only one of the plurality of media is enabled to reproduce the recorded information recorded when the copy control information added to the inputted digital information indicates a move of digital information of which copying is disabled.

Furthermore, the digital information recording apparatus of the present invention, when the copy control information added to the inputted digital information indicates a limit of copying, enables digital information to be recorded only on the recording media within a predetermined number; reproduction from other media is disabled.

The digital information recording apparatus of the present invention, when the copy control information added to the inputted digital information indicates a limit of copying, limits the number of copies of the digital information within a predetermined number.

BRIEF DESCRIPTION OF THE SEVERAL VIEWS OF THE DRAWINGS

These and other objects, features and advantages of the present invention will become more readily apparent from the following detailed description when taken in conjunction with the accompanying drawing wherein.

FIG. 6 is configurations of control information signals of the present invention.

DETAILED DESCRIPTION OF THE INVENTION

Hereunder, an embodiment of the present invention will be described with reference to the accompanying drawings as needed.

While the present invention relates particularly to an apparatus provided with a plurality of recording/reproducing circuits, the whole system to which the present invention applies will be described in prior to the description of the apparatus.

Figure 1:
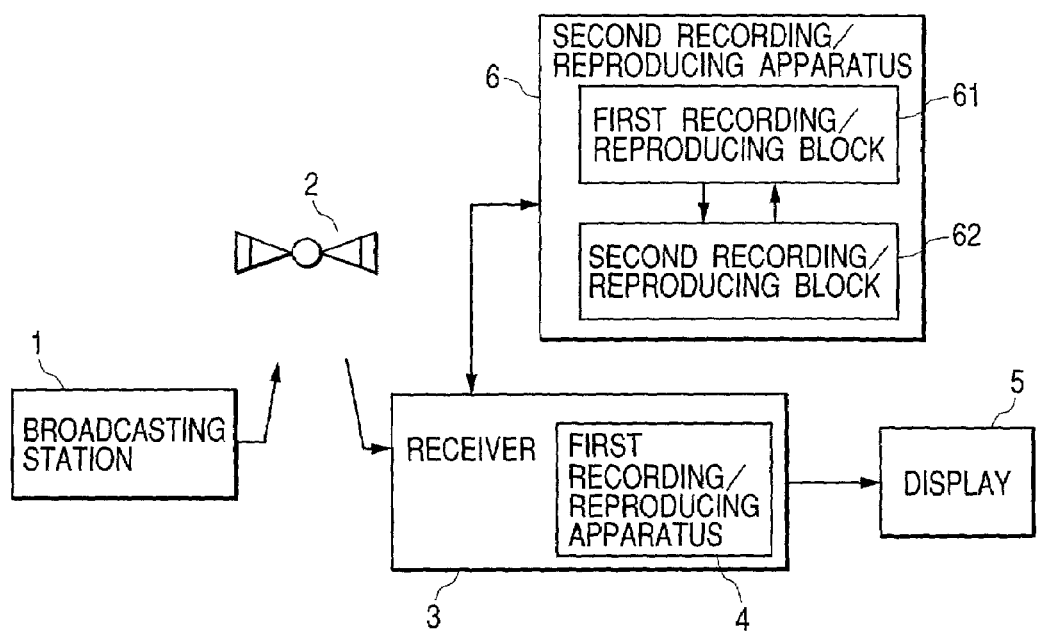
FIG. 1 is a block diagram of a whole digital information sending/receiving/recording system to which the present invention applies.

FIG. 1 shows a block diagram of the whole system in an embodiment of the present invention. The system in FIG. 1 is assumed to send/receive and record/reproduce broadcast information. The system is configured by such an information supply station 1 as a broadcasting station; a relay station 2; a receiver 3; a first recording/reproducing apparatus 4; and a display 5. The system also includes a second recording/reproducing apparatus 6 constituted of first and second recording/reproducing circuits 61 and 62 built in itself When recording broadcast information in this system, at least one of the first or second recording/reproducing apparatuses 4 and 6 can be used to record information according to the copy control information added to the broadcast information. The first recording/reproducing apparatus 4 employs a digital recording method installed in the receiver 3 here. The recording media used for the first recording/reproducing apparatus 4 may be, for example, hard disks, etc. that are not removable. The recording media my also be any of video disks, video tapes, etc. that are movable while the recording/reproducing apparatus built in the receiver is often used to store information for a short time comparatively. The recording media should therefore be those that are not removable when, for example, they are used for "Temporary Recording" as described above. The second recording/reproducing apparatus 6 is provided here with two recording/reproducing circuits. The first/second recording/reproducing circuit 61/62, when the circuit 61 uses hard disks and the circuit 62 uses such removable media as magnetic tapes, optical disks, etc., can be used in accordance with different two purposes by making good use of their features. The first recording/reproducing apparatus 4 may have a plurality of recording/reproducing circuits and both of the first and second apparatus recording/reproducing apparatuses 4 and 6 may have a plurality of recording/reproducing circuits. In this embodiment, however, the above example is taken up as a representative one. In this case, the present invention enables the system to omit the first recording/reproducing apparatus 4.

The information supply station 1 such as a broadcasting station sends signal waves modulated by information via the relay station 2 such as a broadcasting satellite. The signal waves may also be sent via cables, telephones, and land broadcasting, of course. The signal waves received by the receiver 3 at the receiving part is demodulated to information signals as to be described later, then recorded as proper signals in the first recording/reproducing apparatus 4 and/or the second recording/reproducing apparatus 6 as needed. The signals are also sent to the display 5. Thus, the user can watch the information directly on the display 5. In addition, the information reproduced by the first recording/reproducing apparatus 4 and/or the second recording/reproducing apparatus 6 is output onto the display 5 via the receiver 3, thereby the user can obtain restored original video/voice information. When the user obtains information recorded beforehand on a removable recording medium, for example, as package software, the medium is set, for example, in the second recording/reproducing apparatus 6 and the subsequent operations that follow the reproduction are executed in the apparatus 6. Although digital signals are usually sent/received between apparatuses, analog signals are also sent/received between, for example, the receiver 3 and the display 5.

Figure 2:
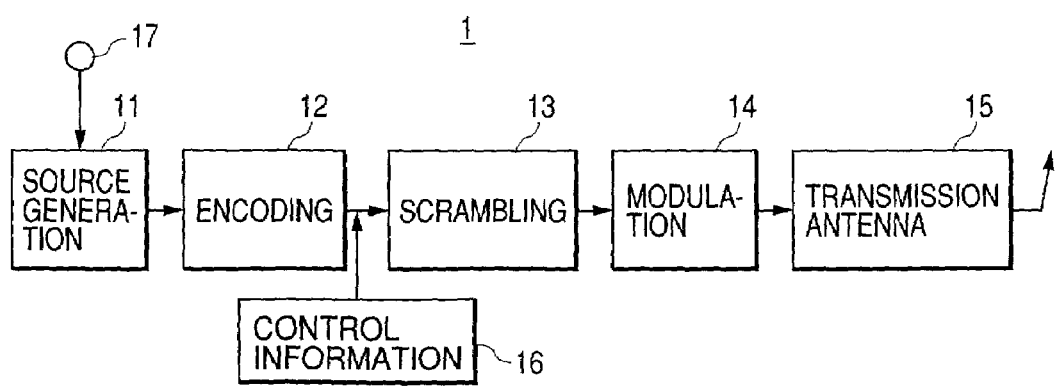
FIG. 2 is a block diagram of an information supply station 1 such as the broadcasting station shown in FIG. 1.

FIG. 2 shows a block diagram of such an information supply station 1 as a broadcasting station, included in the system described above. The information supply station 1 comprises a source generator 11; an encoding circuit 12 for compressing information with use of the Moving Pictures Experts Group (MPEG) method or the like; a scrambling circuit 13; a modulation circuit 14; a transmission antenna 15; a management information adding circuit 16; and an input terminal 17.

Video/voice information, etc. generated in the source generator 11 constituted of a camera, a recording/reproducing apparatus, etc. is compressed by the encoding circuit 12 so that it can be sent in a less-occupied band. The video/voice information is also encrypted in the scrambling circuit 13 so that only specific users can watch the information. The information, after being modulated in the modulation circuit 14 to signals to be sent more appropriately, is emitted as radio waves to the relay station 2 such as a broadcasting satellite from the transmission antenna 15. At this time, the management information adding circuit 16 adds the above-described copy control information, as well as other information such as the current time, etc. to the received information waves. The input terminal 17 receives request information, etc. received via a telephone line, etc. although it is not illustrated in FIG. 1. Such the request information, etc. are used in the system to decide information to be sent out in response to requests from the viewers, such as video-on-demand requests.

Actually, however, a plurality of information items are often multiplexed in one radio wave by means of spectrum diffusion, etc. Although not shown in FIG. 2 to simplify the description, a plurality of systems are prepared for both of the source generator 11 and the encoding circuit 12, so that a multiplexing circuit used to multiplex a plurality of information items is placed between the encoding circuit 12 and the scrambling circuit 13.

Figure 3:
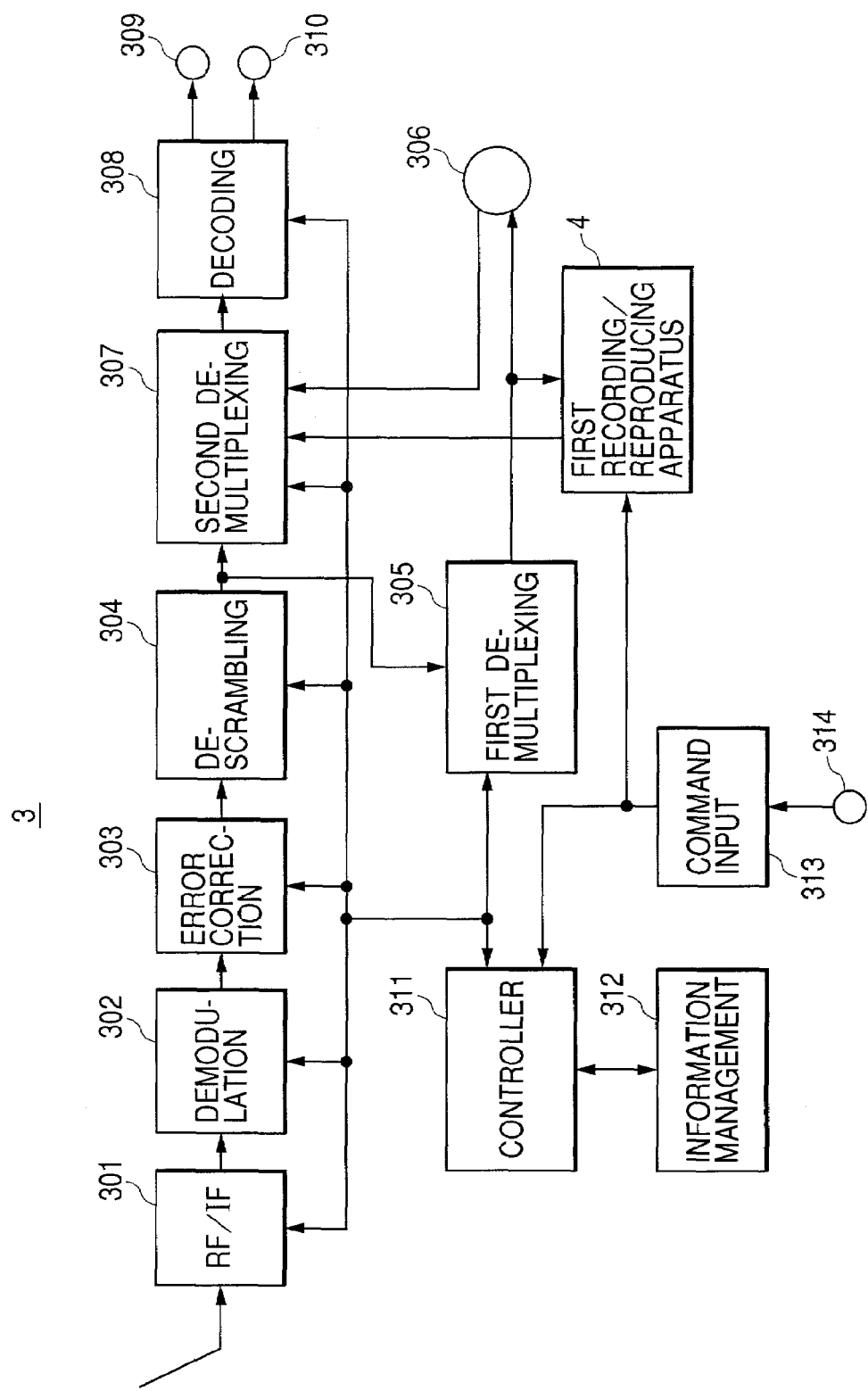
FIG. 3 is a block diagram of a receiver 3 shown in FIG. 1.

FIG. 3 shows a block diagram of the receiver 3 employed in the system shown in FIG. 1. The receiver 3 comprises a Radio Frequency/Intermediate Frequency (RF/IF) conversion circuit 301; a demodulation circuit 302; an error correction circuit 303; a descramble circuit 304 used to decrypt signals; a first demultiplexing circuit 305; and input/output terminal 306; a second demultiplexing circuit 307; a decoder circuit 308; output terminals 309 and 310; a control circuit 311 for controlling the receiver 3 entirely; an information management circuit 312; a command input circuit 313; and an input terminal 314. The first recording/reproducing apparatus 4, as described with reference to FIG. 1, is assumed to be built in the receiver 4. In FIG. 3, a solid line shows a flow of main information such as video/voice information, etc. A dotted line shows a flow of control signal information between component elements.

Hereinafter, the flow of video/voice information indicated by a solid line will be described first with respect to the component elements 301 to 310. The RF/IF conversion circuit 301 receives radio waves transferred from such a relay station as a broadcasting satellite, etc. The frequency of the radio waves in the RF band is converted to an IF band (Intermediate Frequency) frequency or signals in a fixed band independent of the receiving channel. The signals are then demodulated in the demodulation circuit 302 so as to be sent out. Then, code errors that are generated during the transmission are detected and corrected in the error correction circuit 303, then decrypted in the descramble circuit 304. After this, those signals are sent to the first and second demultiplexing circuits 305 and 307. As described above, especially for digital broadcasting, a plurality of information items are often multiplexed in one channel with use of a method of time-division, spectrum diffusion, etc. The demultiplexing circuit is used to separate only desired information from those multiplexed information items. The reason why two demultiplexing circuits are provided in the system is to enable a competing program in the same time-shot to be recorded and enable the first demultiplexing circuit 305 to remove unnecessary worthless information. In other words, such additional information as weather report, program schedule, etc. are often added to the information and such the information is worthy only at that time of broadcasting; they are not worthy to record, so it is erased here.

The output of the first demultiplexer circuit 305 is connected to the first recording/reproducing apparatus 4 so as to be recorded on the recording media therein as needed. The input/output terminal 306 is a bi-directional terminal used to send/receive such digital data to record/reproduce to/from the second recording/reproducing apparatus 6. Of course, the number of the terminal lines may not be only one; it may be a plurality of single direction or bi-directional lines. Generally, the IEEE1394 standard is employed for such the terminal connection. As described above, the second demultiplexer circuit 307 receives information sent from the descramble circuit circuit 304, information reproduced by the first recording/reproducing apparatus 4, or information reproduced by the second recording/reproducing apparatus 6 and sent via the input/output terminal 306. The second demultiplexer circuit 307 can thus select any of those information items and separates the desired information from them. The next decoder circuit 308 decodes motion picture data compressed in prior to the transmission and sends the decoded data to an external apparatus via the output terminal 309/310. The digital broadcasting described above handles HD (High Definition) information having as many as more than 1000 scanning lines and SD (Standard Definition) information having about 500 scanning lines. When the former is defined as HD output and the latter is defined as SD output to correspond to such the two types of information, information from the output terminal 309 maybe supplied to HD type displays and information from the output terminal 310 to SD type displays respectively. The information from the output terminals 309 and 310 may be varied such way between digital and analog in accordance with the input of the target display.

Next, the control signal indicated by a dotted line will be described. The control circuit 311 sends/receives control signals to/from each component element (301 to 305, 307 and 308) to control the receiver 3 to execute desired operations. The information management circuit 312 supplies management data to the control circuit 311 in response to the request therefrom. For example, the management circuit 312 manages information of receiving contracts. When a user specifies a desired channel, this specification is inputted to the input terminal 314 and sent to the control circuit 311 via the command input circuit 313. The control circuit 311 then requests the information of the user's receiving contract to the information management circuit 312. When the user specified channel is contracted, the management circuit 312 sends a control signal to each component element described above to enable the user to receive the channel contents. The information management circuit 312 also manages information of timer reservation by each user. When a reserved time is reached, the control circuit 311 sends a control signal to each component element described above to start a receiving operation.

When the first recording/reproducing apparatus 4 is built in the receiver 3, information is recorded/reproduced according to the user specification received via the input terminal 314. Consequently, the output of the command input circuit 313 is supplied to the first recording/reproducing apparatus 4. This control signal may be supplied from the control circuit 311.

Next, the recording/reproducing operation of the digital recording/reproducing apparatus will be described with reference to FIGS. 4 and 5. The first recording/reproducing circuit 61 and the second recording/reproducing circuit 62 built in the first recording/reproducing apparatus 4 and the second recording/reproducing apparatus 6 described above respectively may be basically identical to each other in circuit block configuration. In this embodiment, both of the circuits 61 and 62 employs a digital recording method. The configuration of the conventional recording/reproducing circuits that employs an analog recording method have been well known, so the description for them with reference to drawings will be omitted here. The present invention may apply to any system in which both of analog and digital recording methods are employed, for example, the second recording/reproducing circuit 62 employs the analog recording method.

Generally, many digital recording/reproducing apparatuses enable compressed bit streams transmitted or broadcast as digital signals to be recorded as are. In this case, such a digital method as the IEEE1394 standard should preferably be used to send/receive information to/from the receiver 3, for example, the second recording/reproducing apparatus 6 as described above. The recording media may be any of removable disks such as digital video disks, disks set in hard disk units, etc. As described above, a hard disk drive may be used as the first recording/reproducing apparatus 4 and a removable disk drive as the second recording/reproducing apparatus 6 separately in accordance with the use purpose.

Figure 4:
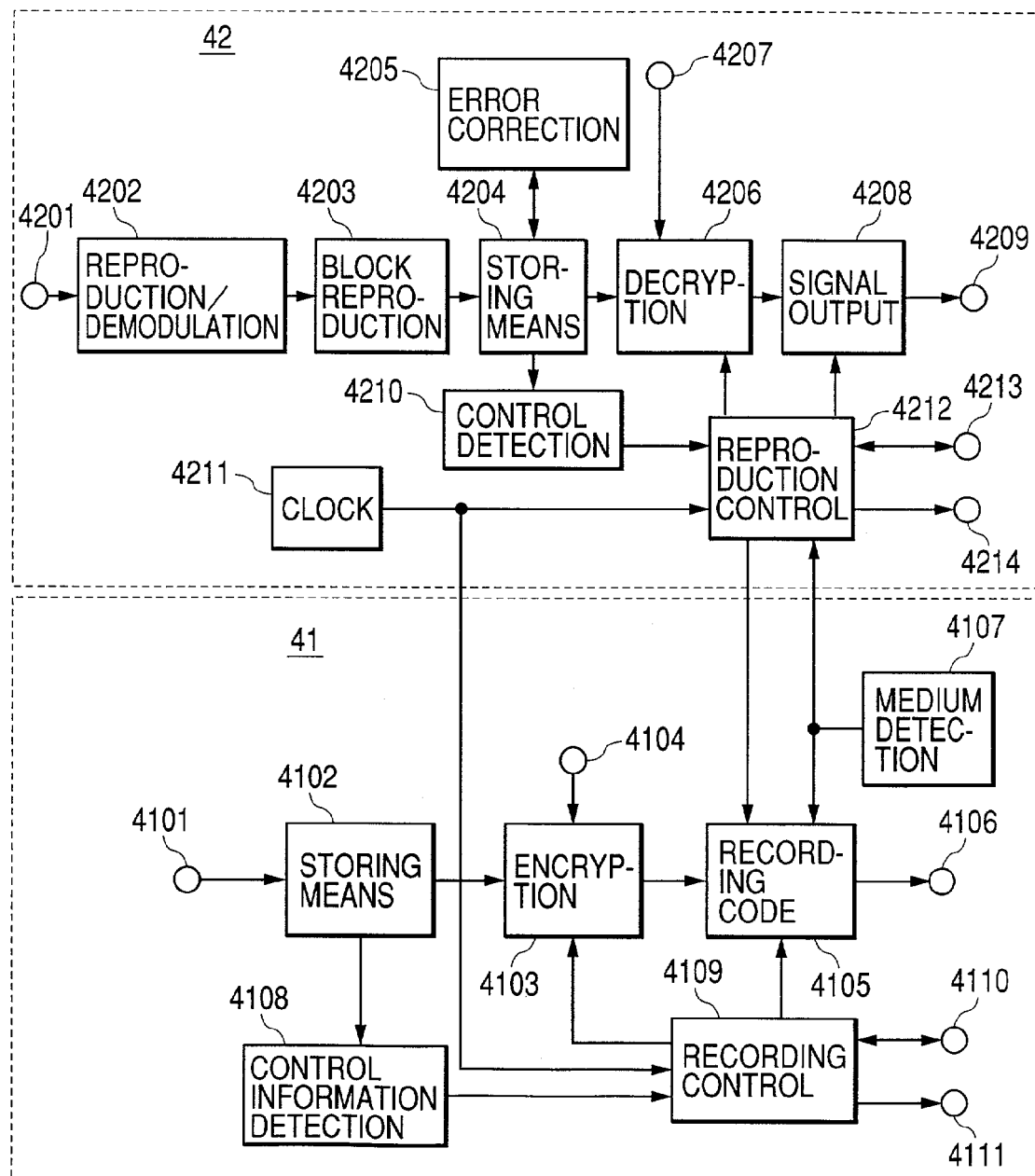
FIG. 4 is a block diagram of the recording/reproducing apparatus 4 shown in FIG. 1.

FIG. 4 shows a block diagram of a digital recording/reproducing apparatus. The recording/reproducing apparatus is specially suitable for disks used as recording media. The recording circuit 41 comprises a record signal input terminal 4101; a storage 4102 constituted of a semiconductor memory or the like; an encryption circuit 4103; an encryption key input terminal 4104; an encoder circuit 4105; an output terminal 4106 of signals to be recorded on recording media; a media detector circuit 4107; a control detector circuit 4108; a recording control circuit 4109; a control signal input/output terminal 4110; and a control signal output terminal 4111. The reproduction circuit 42 comprises a storage 4204 constituted of a semiconductor memory or the like; an error correction circuit 4205; a decryption circuit 4206; a decryption key input terminal 4207; a signal output circuit 4208; an output terminal 4209 for sending reproduced signals to a receiver, etc.; a control signal detector circuit 4210; a clock 4211; a reproduction control circuit 4212; a control signal input/output terminal 4213; and a control signal output terminal 4214.

Figure 5:
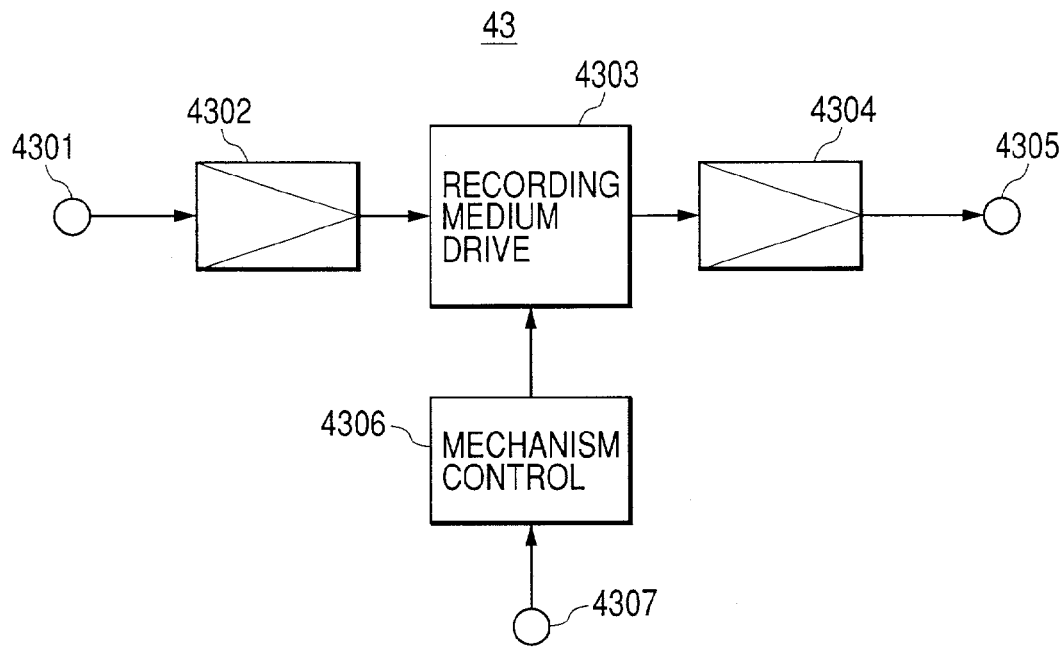
FIG. 5 is a block diagram of a peripheral portion of the recording/reproducing apparatus shown in FIG. 4.

FIG. 5 shows a block diagram of a peripheral portion of a recording medium used for the above recording/reproducing apparatus. The recording/reproducing circuit 43 comprises an input terminal 4301; a recording amplifier 4302; a recording media drive 4303 in which a hard disk, a video disk, video tape, etc. are set; a reproduction amplifier 4304; an output terminal 4305; a mechanism control circuit 4306; and an input terminal 4307.

At first, the operation of the recording circuit 41 of the recording/reproducing apparatus will be described with reference to FIG. 4. Information to record is inputted to the input terminal 4101 from the first multiplexer 305 shown in FIG. 3. The information is decrypted in the descramble circuit 304. This invention also enables non-decrypted information to be inputted to the input terminal 4101, of course.

This information is also supplied to the second recording/reproducing apparatus 6 via the input/output terminal 306. In addition, the information reproduced by the reproduction circuit 42 (to be described later) and output from the output terminal 4209 is also supplied to the input/output terminal 306 shown in FIG. 3. Consequently, in the second recording/reproducing apparatus 6, the input terminal 4101 and the output terminal 4209 may be united into one input/output terminal. Of course, this does not mean that there is only one signal line used for the combined terminal; a plurality of uni-directional or bi-directional signal lines may be used for the input/output terminal. The input/output terminal may conform to the IEEE1394 standard.

Received information is stored in circuits in the storage 4102. Video/voice digital information, as well as various control information items to be shown in FIG. 6A later are added to the inputted information. For broadcasting, such the control information is added, for example, by the management information adding circuit 16 shown in FIG. 2. The control information is supplied to and detected by the control detector circuit 4108. As to be described in detail later, the recording control circuit 4109 decides whether to record the signal, as well as whether to encrypt the signal at the time of recording according to this control information. The control circuit 4109 then sends the result to both of the encryption circuit 4103 and the encoder circuit 4105.

On the other hand, video/voice information output from the storage 4102 is encrypted as needed in the encryption circuit 4103 according to the control signal received from the recording control circuit 4109. The information received, for example, via the input terminal 4104, is used for the encryption. The information received via the input terminal 4104 includes a device key such as an apparatus identification number, etc., a user key such as a personal ID read from a user (Intearated Circuit (IC) card loaded in the apparatus, or a content key generated at random for each information item (content) to be recorded. When the control information is "Copy Never" that means disabling of recording or "one generation of copies is permitted" that means enabling of recording only for one generation, both of which requires high security, the information (content) may be encrypted so as not to be read by any third party for the above-described conditioned "Temporary Recording".

When encryption is done for each program (content), keys may be changed with time in the same content; for example, keys may be changed for each sector. Encrypted information is transferred to the encoder circuit 4105. The encoder circuit 4105 shuts off information that is not to be recorded according to the control information received from the control circuit 4109. For the information to be recorded, the encoder circuit 4105 modulates the information in accordance with the medium to be used and outputs the modulated information to the output terminal 4106.

In addition to the copy control information, the control circuit 4109 also sends the current recording time output from the clock to the encoder circuit 4105. This current recording time is recorded together with the information to be recorded. The current clock time, when it is included in received information, may be used as is. The clock 4211 maybe calibrated by the received information.

Furthermore, the information signal output from the output terminal 4106 is transferred to the input terminal 4301 of the recording/reproducing circuit 43 shown in FIG. 5. This signal is amplified in the recording amplifier 4302 so as to be enabled to drive a laser generation element and/or a magnetic head, then recorded on a recording medium as described above in the recording media drive 4303. The control circuit 4306 for mechanisms such as a motor for driving the recording media drive 4303 controls the recording media according to the control signals received via the input terminal 4307.

The output of the recording control circuit 4109 shown in FIG. 4 is connected to the output terminal 4111. This output may also be connected to the input terminal 4307 shown in FIG. 5 so as to instruct the mechanism control circuit 4306 to stop the recording operation when recording-disabled information such as "Temporary Recording" is received. The input/output terminal 4110 shown in FIG. 4 receives/outputs controls input/output of signals from/to external apparatuses. For example, control information may not be detected by the control detector circuit 4108 and it may be received from external separately from video/voice data. In the second recording/reproducing apparatus 6 used for such the operation, the input/output terminal 4110 may be used together with the input terminal 4101 and the output terminal 4209 conforming to the IEEE1394 standard.

Next, how to reproduce recorded information in the recording/reproducing apparatus will be described. An information signal reproduced from the recording media drive shown in FIG. 5 is amplified in the reproduction amplifier 4304 up to a level for enabling processings in the subsequent components. The signal is then output to the output terminal 4305. The input terminal 4307 receives control signals output from the output terminal 4214 and used to control the mechanism control circuit 4306. The control signals are generated by the reproduction control circuit 4212. Usually, both of the recording control circuit 4109 and the reproduction control circuit 4212 are disposed in the same semiconductor device. In this case, the output terminals 4111 and 4214 can be used commonly.

Information signals output from the output terminal 4305 shown in FIG. 5 are received by the input terminal 4201 of the reproduction circuit shown in FIG. 4. Those signals are then supplied to the reproduction decoder circuit 4202. The signals recorded/modulated at the recording part so as to be recorded/reproduced on/from a recording medium are demodulated here so as to equalize the waveforms and determine the data with a clock. After this, the sync signal and the ID signal of each of those signals are detected in the circuit reproduction circuit 4203. According to the sync and ID signals, the data to be reproduced is stored once at a predetermined position in the storage 4204. The error correction circuit 4205 detects code errors generated in a recording/reproducing process when in arithmetic operation for stored data and corrects them to correct values. The error-corrected data is sent to the decryption circuit 4206. This operation is to decrypt the data encrypted in the encryption circuit 4103 in the recording process. The device key, user key such as a personal ID, or content key is used for the decryption. When the key is not a predetermined one, the encryption is not done normally, thereby the watching of the content is rejected. Consequently, the recorded medium is hardly reproduced in another apparatus nor watched by the user, although the content can be reproduced by the apparatus that has recorded it so as to be watched by the user. The encoding key received via the input terminal 4207 may be obtained from the encrypted information 111 shown in FIG. 6B or obtained by decrypting the information 111.

On the other hand, the control signal detector circuit 4210 detects copy control information, recording time, etc. from the error-corrected data described above. Then, the to reproduction control circuit 4212 decides whether to output reproduced data according to those information items and the current time obtained from the clock 4211 to control the output of the signal output circuit 4208. The reproduction control circuit 4212 may also start or stop the decryption circuit 4206. For example, a reproduction/watching period is limited as described above and when this period is over, the signal output circuit 4208 is controlled not to output at least information that can be watched normally. The control information may also be sent from the output terminal 4214 to the input terminal 4307 shown in FIG. 5 so as to stop the reproduction from the recording media drive itself.

When reproduced information output is authorized, the information is output to the output terminal 4209, then onto the display 5 via the receiver 3 shown in FIG. 1. Data to be compressed with the MPEG method in the encoder circuit 12 shown in FIG. 2 is restored to its original amount by the decoder circuit 308 of the receiver 3. The user can thus watch the restored information contents. The decoder circuit 308 may be built in the display 5.

When the copy control information is different from that having been described so far and it is embedded in video information as an electronic "water mark", the same controlling can be made with use of the information detected from this electronic "water mark" at the time of reproduction.

The clock 4211 is naturally required of a certain level of accuracy in its operation. The time cannot be changed easily by the user with malicious intent. The time should preferably be controlled with the time information received from a broadcasting station, etc. The recording/reproducing apparatus may be configured so that when the time is changed intentionally, the apparatus operation is disabled.

The input/output terminal 4213 sends/receives control information to/from external apparatuses. For example, the terminal 4213 is used to store reproduced information in an external recording apparatus. The input/output terminals 4110 and 4213 may be used commonly. The second recording/reproducing apparatus 6 enables information of the input terminal 4101 and the output terminal 4209 only with one system in accordance with, for example, the IEEE1394 standard or send/receive data with use of an infrared beam or the like. And, because the apparatus 6 is provided with two recording/reproducing circuits 61 and 62, the input terminal 4101, the output terminal 4209, and the input/output terminals 4110 and 4213 of each circuit 61/62 may be used commonly and maybe connected to the input/output terminal 306 shown in FIG. 3.

Control signals sent from the reproduction control circuit 4212 to the encoder circuit 4105 are used, for example, to specify erasing of information at the time of reproduction. Concretely, a control signal is used to erase the information that has passed the limit time of watching and the information that is reproduced once regardless of the limit time. When moving some reproduced information from medium to medium, the information must be erased after it is reproduced. A control signal is also used to erase such the information. When a disk is used as a recording medium, the encoder circuit 4105 generates meaningless signals as information according to this control signal and records the signals to erase the target information. The control signal may also be used to erase encrypted information such as an encryption key, etc. In this case, it is premised that data is erasable from the recording media. The media detector circuit 4107 is prepared for such the processings. The above method is effective for such apparatuses as the second recording/reproducing apparatus 6 that uses removable recording media. When recording some information on a condition that the information is to be erased later, the recording is disabled for apparatuses that employ such non-erasable media as Compact Disc Recordable (CD-R), etc. Similarly, reproduction is disabled for moving information from such the non-erasable media. The media detector circuit 4107 sends a control signal to the encoder circuit 4105 and the reproduction control circuit 4212 to disable those operations. This completes the description of the basic reproducing operations with reference to FIGS. 4 and 5.

Figure 6A:
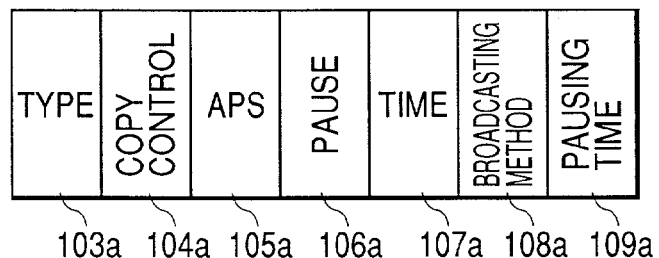
FIG. 6A shows a signal received from an information supply station.
Figure 6B:
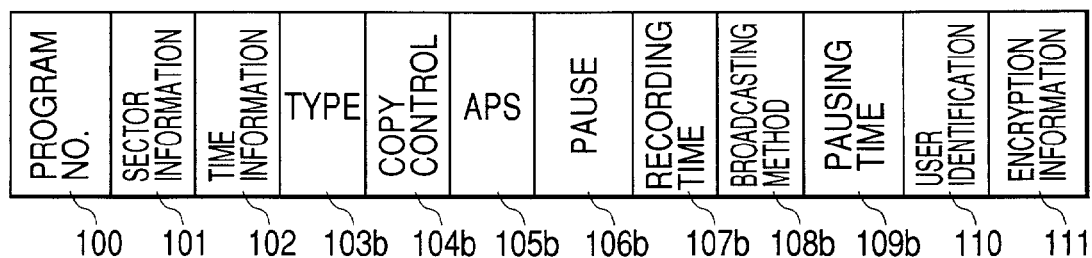
FIG. 6B shows a signal recorded on a recording medium.

FIG. 6 shows a configuration of a control information signal employed in this embodiment. FIG. 6A shows control information received by the receiver 3, then inputted to the first recording/reproducing apparatus 4 or the second recording/reproducing apparatus 6 and detected by the control detector circuit 4108 at the recording part. FIG. 6B shows control information updated in the encoder circuit 4105 according to the control information shown in FIG. 6A, then recorded on a recording medium together with some contents added thereto. The control information shown in FIG.

6B is recorded beforehand in package software, etc. In FIG. 6B, the same numbers are given to the similar information items as those in FIG. 6A to indicate the correspondence between them. The information shown in FIG. 6B, for example, when it is to be recorded on a tape medium, will be recorded completely on the medium when one recording track records one information item. The information is naturally recorded in a definite relationship with video/voice data, etc. so that it can be separated easily at the time of reproduction.

Next, a description will be made for the contents shown in FIG. 6 in comparison with the circuit block shown in FIG. 4 as needed, then the operation of the embodiment of the present invention. In FIG. 6B, a program number 100 indicates the actual program number on the medium.

Sector information 101 is a sector number of a program divided by a predetermined unit when it is recorded on a medium. The program may also be divided by a fixed unit, for example, in units of 2K bytes or a unit of information, for example, a unit of dividing at the time of encoding. The number may also be assigned in the subject program and it may be a serial number on the whole recording medium. Such information as a recording time 107b (to be described later) is added for each sector.

Time information 102 indicates a progress of the recording; it indicates a portion of a program up to which the recording is completed. The above information is added when some information is recorded on a medium.

A type 103b indicates attribute information for indicating that the program is sold, rented, created by the user himself/ herself, or recorded from broadcasting. As shown with 103a in FIG. 6A, the attribute information, when it is added in a step of transmission, may be recorded as is.

Next, copy control 104a in FIG. 6A indicates whether or not the information may be recorded on a recording medium. Concretely, the copyright holder such as the information creator selects and decides one of the choices "Copy Never", "one generation of copies is permitted", and "Copy Free". In the case of broadcasting, such the copy control is often set by the management adding circuit 16 shown in FIG. 2. The copy control 104b shown in FIG. 6B is updated in the encoder circuit 4105 shown in FIG. 4 as needed when in recording according to this information 104a. When the information 104a indicates "Copy Free", the information may be recorded as is. When the information 104a indicates "one generation of copies is permitted", it means in principle that the information can be copied once on the condition of "Copy No More (one generation of copies is permitted)". The copy control information is thus updated to "Copy No More" when the information is recorded on a medium. When "Temporary Copy" is enabled, the copy control information is kept at "one generation of copies is permitted" or updated to "Copy No More", then the information is enabled to "be recorded temporarily". When "Copy Never" is set for the control information 104a, the recording is disabled in principle. When "Temporary Copy" is enabled, however, the control information "Copy Never" is kept as is for recording the target information. When information software is recorded on a medium for supply, the copyright holder records the information when he/she creates the contents. In other words, it is possible to send two-bit information with use of the four states "Copy Never", "one generation of copies is permitted", "Copy No More", and "Copy Free". In this case, it is assumed that (1, 1) is set for "Copy Never", (1, 0) for "one generation of copies is permitted", (0, 1) for "Copy No More", and (0, 0) for "Copy Free".

The APS 105a is copy control information (APS; Analogue Protection System equivalent to an analog copy control signal) This information, as described in the official gazette of JP-A 288582/1986, is used to control whether to enable copying to an analog recording apparatus, for example, by adding a pseudo pulse to each analog video signal. The information may be recorded as is as the APS 105b.

The Pause 106a indicates whether to enable "Temporary Recording" when "Copy Never" is set for the copy control information 104a. The "Temporary Recording" is referred to as a pausing function, since it functions just like pausing of broadcasting only for a period. For example, when "Temporary Recording" is enabled, "0" is set and when it is disabled, "1" is set, so that information sending can be controlled with one bit. Consequently, the copyright holder can manage whether to enable "Temporary Recording".

In addition, "Temporary Recording" may be enabled for "one generation of copies is permitted" so as to use this bit to control whether to enable "Temporary Recording". When "1" is set to disable "Temporary Recording", the copy control information is updated to "Copy No More" for recording information. When "0" is set to enable "Temporary Recording", recording is done while the copy control information "one generation of copies is permitted" is kept as is or it is updated to "Copy No More", then updated to "one generation of copies is permitted" in the signal output circuit 4208 shown in FIG. 4 when reproduced information is output within a limit time.

In any case, when "0" is set to enable "Temporary Recording", the "0" may be updated to "1" in the encoder circuit 4105, etc. to record information. This can solve the problem of repeating of "Temporary Recording" in other apparatuses within a limit time.

The copy control information elements 104a and 104b, as well as the pause elements 106a and 106b are most important signals in the present invention.

The time element 107a indicates, for example, the current time of broadcasting set by the management information adding circuit 16 shown in FIG. 2. This current time may be recorded as a recording time 107b as is or the clock 4211 shown in FIG. 4 may be calibrated so that the calibrated time is recorded. This recording is done in sectors. For example, The time values 107a and 107b are very important for managing the "Temporary Recording" when "Copy Never" is set for the copy control information, although the time for reproducing and watching the target contents is limited.

The broadcasting method 108a indicates a broadcasting method HD (High Definition) information, SD (Standard Definition) information, etc. used for subject information. This information may be recorded as the information 108b as is.

The pausing time 109a indicates a limit element within which subject content can be reproduced and watched after "Temporary Recording" when "Copy Never" is set for the copy control information. Generally, the limit time is as short as 90 or 120 minutes, so that the user will feel inconvenience sometimes. For example, when "Temporary Recording" is done at midnight, the user must watch the recorded content before his/her going to bed. To avoid such a trouble, for example, a 3-bit value can be set for the Pause time 109a so that various times can be set. For example, "001" can be set for 90 minutes, "010" for one day, "011" for one week, "100" for one month, "101" for half a year, "110" for one year, and "111" for limitless. Consequently, such the user's feeling of inconvenience caused by the short pausing time can be eliminated under the management of the copyright holder. Such a 3-bit value may be used as the element 109*b* for recording. This 3-bit information may also be used for "one generation of copies is permitted" that disables "Temporary Recording". In this case, after the "Temporary Recording", the copy control information 104*b* is kept at "one generation of copies is permitted" for this period, then the 104*b* information is updated to "Copy No More" when the limit time is up. The copy control information 104*b* may also be updated to "Copy No More" for recording, then it is updated to "one generation of copies is permitted", for example, in the signal output circuit 4208 shown in FIG. 4 so as to output the contents reproduced within the limit time.

In FIG. 6B, the user identification element 110 is recorded when a user specific code is used to disable reproduction of information except for the same apparatus as that used for recording or only the user of the apparatus.

The encryption information 111 is used to reproduce encrypted recorded information and decrypt the encryption. When there is much data, the code numbers may be recorded and used to reproduce the corresponding information items stored beforehand in the apparatus. The encryption key or encrypted device key used in the encoder circuit 4103 shown in FIG. 4 may be set for this information. The user identification information 110 and the encryption information 111 are added when information is to be recorded.

The above information items are recorded at comparatively short time intervals, for example, for each frame of video data, a fixed amount of data, or the like as needed. The configuration of a control information signal shown in FIG. 6 is just an example. In addition to the items in the signal, other items related to the configuration and medium such as positions, frequencies, and other items of recording may also be included in the signal. Those items in the signal are not always indispensable in the present invention, however. Some of them maybe omitted. The order of those elements in the signal may also be changed.

Next, the operation of this embodiment will be described. It is assumed here that "one generation of copies is permitted" is set for the copy control information 104*a* shown in FIG. 6A with respect to the transmission of information from the information supply station 1 shown in FIG. 1. In this case, the information creator specifies the Pause 106*a* so that "0" is set for enabling "Temporary Recording" and "1" is set for disabling "Temporary Recording".

For example, when "Temporary Recording" is done for the first recording/reproducing apparatus 4 built in the receiver 3, the processing proceeds as follows. As described above, when "1" is set for Pause 106*a*, the "Temporary Recording" is disabled.

When "0" is set for Pause 106*a*, the "Temporary Recording" is enabled. To execute the "Temporary Recording" at this time, "0" is updated to "1" in Pause 106*b*. When "one generation of copies is permitted" is set for the copy control information 104*b*, it is kept as is for the "Temporary Recording". It is also possible to instruct the encoder circuit 4105 to update the copy control information 104*b* "one generation of copies is permitted" to "Copy No More" for "Temporary Recording", then decide whether or not the limit time is reached according to the recording time 106*b* and the pausing time 109*b* at the time of reproduction. When the result is NO (not reached), "No More Copy" is updated to "one generation of copies is permitted" to output the information. With this updating of the pausing time 106*b*, "Temporary Recording" is repeated within the limit time, thereby it is prevented that "one generation of copies is permitted" is kept for a long time.

In the case where "Temporary Recording" is done while "one generation of copies is permitted" is set for the copy control information 104*b* and, for example, the above limit time is up at the time of reproduction, it is updated to "Copy No More" in the signal output circuit 4208 to output the information. With the above-described method, it is possible to execute "Temporary Recording" for the information for which "one generation of copies is permitted" is set.

When normal recording (that is not "Temporary Recording") is done for the first recording/reproducing apparatus 4, the processing proceeds as follows. At this time, the copy control information 104*b* is updated to "Copy No More" in the encoder circuit 4105 and "1" is set for Pause 106*b* to record the target information on a recording medium.

In the case where information recorded, then reproduced in the first recording/reproducing apparatus as described above is supplied to the second recording/reproducing apparatus 6 provided with two recording/reproducing circuits 61 and 62, the processing proceeds as follows.

In this stage, when the limit time of "Temporary Recording" in the first recording/reproducing apparatus 4 is not reached yet, "one generation of copies is permitted" is reset and the recording can be continued just like the first receiving of information in the receiver 3. However, because "1" is set for Pause 106*b*, "Temporary Recording" is disabled. The "Temporary Recording" is enabled only when information is received directly from the receiver 3 independently of the first recording/reproducing apparatus 4 and "0" is set for Pause 106*a*.

To start recording, the copy control information 104*b* is updated to "Copy No More" in the encoder circuit 4105 so that copying is disabled after that. This makes it possible to achieve the initial intention of enabling "one generation of copies is permitted".

In this case, when 62 apparatuses (limit in authorization) provided with two recording/reproducing circuits (generally, n circuits) respectively are connected to the source apparatus as described above, a problem arises; the number of copying media becomes 124 (generally, 62×n media). This will disadvantage the copyright holders. This embodiment intends to solve the problem as follows.

Firstly, the second recording/reproducing apparatus 6 provided with a plurality of recording/reproducing circuits is configured so that any one of the circuits is enabled to record target information when "one generation of copies is permitted" is set for the copy control information. The user or the apparatus may be enabled to select the choice.

Secondly, the number of sync apparatuses to be connected and authorized by the source apparatus (the second recording/reproducing apparatus 6 in this case) is limited to, for example, 31 units, which is a half of the conventional number. This method is realized easily with the operation of the software installed in the reproduction control circuit 4212 and effective when each of the sync part apparatuses is provided with n=2 recording/reproducing circuits. When each of the sync apparatuses is provided with n=3 recording/reproducing circuits, the number of recording media becomes 62 or more. On the contrary, when only the sync apparatuses provided with n=1 recording/reproducing circuit are connected to the source apparatus, the number of recording media becomes only 31.

In other words, the number of copies can be limited only to m×n in maximum when the number of sync side units to be connected and authenticated to m-units and the number of sync side recording/reproducing circuits (media) is limited to n-units.

In this embodiment, therefore, the source apparatus is enabled to use a method for recognizing the number of recording/reproducing circuits provided for the sync apparatuses in an authorization operation executed for each connected apparatus. The authorization starts with sending of key information from each sync apparatus to the source apparatus after both apparatuses are connected to each other via a cable, etc. This key information is used to report the source apparatus that the sync apparatus operates according to, for example, the above-described copy control information. And, when the source apparatus decides giving information to the sync apparatus according to this key information, the authorization is established, thereby such operations as copying, as well as moving (to be described later) are enabled between both of the apparatuses. When the authorization is not established, such the operations are disabled between both of apparatuses.

The key information sent from each sync apparatus to the source apparatus includes a code that indicates the number of recording/reproducing circuits of the sync apparatus or a code that indicates the number of recording/reproducing circuits having recording media at that time and the number of the apparatuses is totaled in the source apparatus. For example, when the number of the apparatuses exceeds the limit number of 62 units, the authorized key information sent from any sync apparatus over the limit number is rejected by the source apparatus. Consequently, this can solve the problem that recording media might be prepared over the limit number.

There is a method for backing up recorded information that is erased by accident in any of the recording/reproducing circuits of a sync apparatus. The number of the recording/reproducing circuits in which information is to be backed up is not included in the above total.

There is also another method that is especially effective for a case in which one of the two recording/reproducing circuits 61 and 62 uses a hard disk as a fixed medium and the other uses such a removable medium as a magnetic tape, optical disk, or the like. In this case, 62 sync apparatuses are connected in total and information is recorded in the two recording/reproducing circuits in each of those apparatuses just like conventionally. And, the information recorded on the fixed hard disk is set so as not to be reproduced just after the recording is completed as expected or when the removable medium is removed after the recording is completed. In other words, meaningless codes generated by the encoder circuit 4105 are recorded as information on the hard disk so that the information cannot be reproduced therefrom nor used actually at least in part or in whole. Consequently, a hard disk can be used effectively to back up failed recording occurred at a removable medium while the number of the finally remaining media is limited to 62 as conventionally, thereby solving the above problem without disadvantaging any of the copyright holder, the manufacturer, and the user.

It is also possible to avoid such disabling of reproduction when the information recorded on a hard disk is used just for a specific purpose, for example, for backing up the information lost by accident.

When the function is limited so as to disable accesses usually and to be used only for recovery of lost information, the actual number of copies does not increase while the reliability of recorded information is improved.

So far, it has been premised that one recording medium records one digital information item so as to simplify the description. When one recording medium records a plurality of digital information items, however, it is possible to enable recording for respective digital information items, not for respective media. For example, when anyone of recording media records the same digital information at two different places, the number of valid recording media can be reduced by one, that is, reduced to 61. Such the reduction in the number of valid recording media is notified to the source apparatus from a sync apparatus so as to be managed by the source apparatus. In many cases, recording the same digital information at a plurality of places on the same recording medium is usually intended to back up the information that might be lost by accident. In order to meet this, therefore, recording may be limited for each recording medium, not for each digital information item.

Next, a description will be made for a case in which information is sent from the first recording/reproducing apparatus 4 to the second recording/reproducing apparatus 6 on the condition of "Copy No More". In this case, copying is disabled due to the reason as described above; only an operation referred to as "move" is enabled.

The "move" means that the copy control information "one generation of copies is permitted" is updated to "Copy No More" after information is recorded once or "Copy No More" is set when the limit time is up after "Temporary Recording". No copyright holder is disadvantaged in this case even when recording media are changed on the condition of "Copy No More" unless the number of recorded media increases. The user can thus move information recorded on a hard disk to a tape so as to be stored, thereby the usability of the apparatus is improved.

This "move" operation is done on the following conditions.

(1) When information is recorded on a new medium from an original medium, the information on the original medium is erased wholly or partially, thereby disabling reproduction of information at a practical quality level from the original medium.

(2) Information can be moved only to one apparatus. Of the above two conditions, the condition (1) can achieve the above purpose for disk media, for example, when meaningless codes generated by the encoder circuit 4105 are overwritten on the encrypted information 111.

For the condition (2), when both of the source and sync apparatuses are new digital recording apparatuses, the apparatus authorization may be established with key replacement, etc. only between those two apparatuses at a 1:1 relationship. Consequently, information is never recorded on any other sync apparatuses even when they are connected to the source apparatus via buses. The number of recorded apparatuses thus never increases.

In the event of moving, the copy control information output from the source apparatus might be updated to "one generation of copies is permitted" so as to enable recording in the destination apparatus. At this time, unlike the original "one generation of copies is permitted", recording must be avoided in a plurality of apparatuses. And, the apparatus authorization as described above is effective to achieve the object.

In the example shown in FIG. 1, however, the second recording/reproducing apparatus 6 connected as the destination apparatus is provided with two recording/reproducing circuits, so that another problem arises; information is recorded on two media even when it is moved to only one apparatus 6. This problem cannot be solved with the above authorization method however it is improved, since the authorization with the source apparatus is done on the basis of the connector on the housing.

One of the methods for solving this problem is enabling recording for only one of the two recording/reproducing circuits when information is moved to a so-called double-deck apparatus to be developed in the future. This method is divided into two methods; one method for enabling the user to select one of the circuits and the other method for enabling the apparatus to select one of them.

There is another method for solving the above problem. Just like the above example, this method is especially effective for a case in which a fixed hard disk is used as one of the two recording/reproducing circuits 61 and 62 and such a removable medium as a magnetic tape, optical disk, or the like as the other recording/reproducing circuit. This method disables reproduction of information from the hard disk just after information is recorded on the two recording/reproducing circuits 61 and 62 as expectedly, thereby the recording is completed or when the removable medium is removed after the recording is completed. In other words, meaningless codes generated by the encoder circuit 4105 are recorded at target places on the hard disk so as to disable reproduction and usage of the recorded information at least partially or wholly. Consequently, information, when recording fails on the removable medium, is backed up on the hard disk while the final number of media is limited only to one, thereby realizing the expected "move" operation.

When information is moved as described above, reproduction of the information in the first recording/reproducing apparatus 4 on the source part is disabled by, for example, the encoder circuit 4105.

Furthermore, information recorded on the hard disk is limited in usage; the usage is just enabled for a specific purpose, for example, for backing up the information lost by accident. Just on such the condition, it is enabled to remain the information without disabling the reproduction.

While such a hard disk has been assumed as a fixed recording medium in the above description, the hard disk might be removed and mounted in another apparatus so as to reproduce the information therefrom intentionally. In this case, if the hard disk is removed before disabling reproduction as described above, the information comes to be used without the copyright holder's notice.

To avoid such the problem, it is recommended to use a device key specific to the recording/reproducing apparatus to encrypt the information to be recorded on a hard disk. This will prevent reproduction and usage of the information, since no information can be reproduced from the hard disk without the device key even when the hard disk is removed and mounted in another apparatus. The decryption in this case is done by the encryption circuit 4103.

As described above, according to the present invention, even in a recording/reproducing apparatus provided with a plurality of recording/reproducing circuits, usually called as a double-deck apparatus, it is possible to solve the problem that information on the condition of "one generation of copies is permitted" might be recorded to the number of recording media more than that of conventional art, and information on the condition of "Copy No More" might be moved to a plurality of recording media. This is why the profits of the manufacturer and the copyright holder of the information can be protected.

The present invention may be embodied in other specific forms without departing from the spirit or essential characteristics thereof. The present invention embodiment is therefore to be considered in all respects as illustrative and not restrictive, the scope of the invention being indicated by the appended claims rather than by the forgoing description and range of equivalency of the claims are therefore intended to be embraced therein.

What is claimed is:

1. A digital information recording apparatus having a function of recording received digital information on a plurality of recording media simultaneously, the apparatus comprising:

a plurality of recording circuits for recording the digital information on the plurality of recording media simultaneously; and a controller configured to operate the plurality of recording circuits, wherein when copy control information added to the digital information indicates a limit of a predetermined number of copy generations, then the controller limits the number of recording circuits that can record the digital information on a recording medium to the predetermined number.

2. The digital information recording apparatus according to claim 1 wherein, when the copy control information indicates that one generation of copies is permitted, the predetermined number of recording circuits are enabled to record the digital information on a recording medium.

3. The digital information recording apparatus according to claim 1 wherein a recording medium for backup recording is not included in the limit of the predetermined number of copy generations.

4. A digital information apparatus for providing digital information to a plurality of external information recorders simultaneously, the apparatus comprising:

an authenticating circuit that authenticates the plurality of external information recorders and detects a total number of recording media mounted in the plurality of external information recorders; and an output control circuit that controls the output of digital information simultaneously provided to the external information recorders, wherein, when copy control information added to the digital information specifies a limit of a predetermined number of copy generations and the total number of recording media mounted exceeds the predetermined number, the output control circuit disables providing the digital information to some of the external information recorders such that the digital information is recorded on not more than the predetermined number of recording media.

5. The digital information apparatus according to claim 4 wherein, when the copy control information indicates that one generation of copies is permitted, the output of the digital information is disabled for all but the predetermined number of the plurality of external information recorders.

6. The digital information apparatus according to claim 4 wherein the authenticating circuit does not include a recording medium for specific usage in the total number of recording media.

7. A digital information recording apparatus provided with a function for simultaneously recording digital information on a plurality of recording media, the apparatus comprising:

a plurality of recording circuits for simultaneously recording the digital information on the plurality of recording media, wherein, when copy information added to the digital information specifies a limit of a predetermined number of copy generations, the predetermined number of the recording circuits are enabled to each record the digital information on a recording medium media, and the number of recording media that can be produced by the plurality of recording circuits is limited to the predetermined number.

8. The digital information recording apparatus according to claim 7 wherein, when digital information is recorded on a recording medium for specific usage among the plurality of recording media, the recording medium for specific usage is not included in the number of recording media that can be produced by the plurality of recording circuits.

9. The digital information recording apparatus according to claim 7 wherein disabling of reproduction in the recording apparatus is performed within a predetermined time after completion of recording.

10. The digital information recording apparatus according to claim 7 wherein disabling of reproduction in the recording apparatus is performed when any one of the plurality of recording media is removed from the apparatus, but at the latest within a predetermined time after said removal.

11. A digital information recording apparatus provided with a function for recording received digital information on a plurality of recording media simultaneously, the apparatus comprising:

a plurality of recording circuits which each record the digital information on one recording medium of the plurality of recording media simultaneously, wherein, when copy information added to the digital information specifies a limit of a predetermined number of copy generations, the predetermined number of the plurality of recording circuits is enabled to record the digital information on the predetermined number of recording media.

12. The digital information recording apparatus according to claim 11 wherein, when the copy control information indicates a move of digital information of which copying is not permitted, only one of the plurality of recording circuits is enabled to record the digital information on one recording medium.

13. A digital information recording apparatus provided with a function for recording digital information on a plurality of recording media simultaneously, the apparatus comprising:

a plurality of recording circuits which record inputted digital information on the plurality of recording media simultaneously, wherein, when copy control information added to the digital information indicates a move of digital information of which copying is not permitted, only one of the plurality of recording circuits is enabled to record the digital information on a recording medium.

14. The digital information recording apparatus according to claim 13 wherein disabling of reproduction in the recording apparatus is performed within a predetermined time after completion of recording.

15. The digital information recording apparatus according to claim 13 wherein disabling of reproduction in the recording apparatus is performed when any one of the plurality of recording media is removed from the apparatus, but at the latest within a predetermined time after said removal.

* * * * *